3,032,574
PRODUCTION OF ALUMINUM TRIALKYLS AND ALUMINUM ALKYL HYDRIDES
Karl Ziegler, Kaiser-Wilhelm-Platz 1, Mulheim (Ruhr), Germany, and Hans-Georg Gellert, Mulheim (Ruhr), Germany; said Gellert assignor to said Ziegler
No Drawing. Filed Jan. 27, 1955, Ser. No. 484,576
Claims priority, application Germany Feb. 1, 1954
36 Claims. (Cl. 260—448)

This invention relates to new and useful improvements in the preparation of aluminum trialkyls and aluminum alkyl hydrides.

The invention more particularly relates to a process for the production of aluminum trialkyls and aluminum alkyl hydrides of the general formula $$AlRR'_2$$

in which R' is a saturated aliphatic hydrocarbon radical, and R is hydrogen or a saturated aliphatic hydrocarbon radical. The hydrocarbon radicals represented by R and/or R' can be indentical or different and may have straight or branched chains containing any member of carbon atoms.

The aluminum compounds of the above formula have been found to constitute excellent highly active catalysts or catalyst components, as, for example, in the dimerization of olefins or polymerization of ethylene.

The preparation of aluminum trialkyl in the past necessitated the use of a very complicated reaction which required the presence of auxiliary materials.

It has also been proposed in German Patent No. 917,006 to produce the aluminum trialkyls without the use of these auxiliary materials by the addition of olefins to aluminum hydride in accordance with the following formula:

$$AlH_3 + 3C_nH_{2n} = Al(C_nH_{2n+1})_3$$

The starting aluminum hydride, however, can only be produced by rather complicated process and cannot, for example, be produced by a simple addition reaction between aluminum and hydrogen. The difficulties in the preparation of the aluminum hydride prevent the use of the above-described process for the production of aluminum trialkyls by the addition of olefins to aluminum hydride on an industrial scale.

One object of this invention is the direct production of aluminum trialkyls and aluminum alkyl hydrides by reaction between aluminum, hydrogen and olefins. This, and still further objects will become apparent from the following description:

The surface of metallic aluminum is coated with a very thin, firmly adhering oxide film, which imparts the aluminum its excellent corrosion- and weather-resistant properties. When this passive oxide film is removed, as, for example, mechanically, it rebuilds itself at an extremely high rate of speed.

In accordance with the invention it has now been found that aluminum which presents a surface which is substantially free from this protective oxide film or aluminum which has been activated with a suitable catalyst may be directly combined with olefins and hydrogen to form aluminum trialkyls and/or aluminum alkyl hydrides.

In accordance with one embodiment of the invention, the actual metallic surface of the aluminum is mechanically exposed under conditions which will prevent the formation or reformation of the inert oxide film. The aluminum in this form is then reacted with the hydrogen and olefins.

The formation of the aluminum having at least a portion of its surface substantially oxide-free, may be effected by mechanically removing the oxide film or forming a surface on the aluminum in inert surroundings. This may be effected, for example, by mechanically grinding or cutting aluminum in ambient surroundings, which will prevent the formation of the inert or passive oxide film.

The reformation of the substantially inert or passive oxide film on the aluminum may be prevented in a simple manner by grinding or cutting the aluminum in a suitable apparatus with the complete exclusion of air and moisture and under an inert gas, as, for example, nitrogen or argon. While highly effective, this mode of operation may prove relatively expensive.

The re-formation of the passive oxide film may be more economically prevented by grinding or cutting the aluminum while the same is immersed or wetted in an inert liquid, as, for example, any hydrocarbon, such as higher saturated or unsaturated aliphatic hydrocarbons or aromatic hydrocarbons.

If the olefin which is to be used in the reaction with the aluminum hydrogen to form the aluminum alkyl is liquid, it has been found preferable to use the same as the inert liquid for the grinding or cutting operation.

The actual grinding or cutting may be effected in any known or conventional grinding or cutting apparatus with care being taken that as the aluminum surface is exposed, the same is protected by the ambient inert atmosphere or wetted with the inert liquid.

In accordance with one preferred mode of operation in accordance with the invention, the aluminum is comminuted under a layer of aluminum trialkyl or aluminum alkyl hydride prior to being brought together with the olefin and hydrogen for the reaction. It is preferred to use the same aluminum trialkyl or aluminum alkyl hydride which is to be prepared by the subsequent reaction with the hydrogen and olefin.

If the starting aluminum is in the form of aluminum shot, it has been found highly desirable to effect the mechanical treatment in a ball mill, since the aluminum pulp obtained in this manner may be very easily conveyed through conduits, such as pipe lines. Similar effects may be obtained if aluminum blocks are cut into chips by a suitable apparatus under an inert liquid, as, for example, the liquid aluminum trialkyls or aluminum alkyl hydrides. The use of a cutting device may be somewhat more expensive, since the access of air must be completely prevented during the cutting operation.

The process of the invention can be varied in many ways. For example, it is not necessary, particularly during the first activation of the aluminum, to cut or grind in the presence of pure, concentrated aluminum trialkyl. In order to obtain the complete activation action, it is sufficient to use a solution of the aluminum trialkyl in an inert liquid, and preferably in the olefin which is subsequently to be used for the reaction. If the olefin contains less than 5 carbon atoms, the cutting or grinding device, such as the ball mill, must in this case be able to withstand a few atmospheres gauge pressure, and suitable measures must also be taken in order to transfer the content of the ball mill which is under pressure in a dependable manner into the reaction autoclaves. In order to assure a good action of the ball mill, it is advisable to operate with a ratio of aluminum to liquid of about 1 to 10.

Of course, the mechanical treatment of the aluminum to expose its surface can also take place in the reaction vessel itself, for example, aluminum shot, aluminum trialkyl, grinding balls, olefin, and hydrogen being introduced simultaneously into a tumbling autoclave. From a technical standpoint, however, such a method of procedure has unquestionable disadvantages as compared with grinding in a separate device, such as the ball mill. The reaction autoclave must be able to withstand a pressure of 100 to 200 atmospheres during the reaction, whereas these pressures are not required during the mechanical treatment. Furthermore, it is undesirable to wear away a high grade pressure-proof reaction chamber by introducing grinding balls into it.

In accordance with another mode of operation, the aluminum with the substantially oxide-free surface, may be obtained by melting the aluminum and atomizing the melt in an inert gas stream, thus forming aluminum particles or dust which have a true metallic aluminum surface and which are not coated with the protective oxide. It is also possible to produce a suitable aluminum dust which does not contain the oxide coating by vaporizing the aluminum, as, for example, by distilling the same under a high vacuum and rapidly cooling the vapor in an inert atmosphere.

Instead of, or in addition to mechanically activating the aluminum as described above, in accordance with a further embodiment of the invention, the aluminum may be activated with the use of suitable catalysts. Suitable catalysts for this purpose, include, for example, alkyl aluminum halides of the general formula

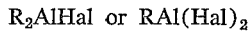
$$R_2AlHal \text{ or } RAl(Hal)_2$$

in which R is an alkyl radical, and Hal is halogen, i.e., fluorine, chlorine, bromine, or iodine. These catalysts may be used either alone or in the form of their mixtures, as, for example, in the form of so-called sesqui-halides, i.e., mixtures of the dialkyl aluminum monohalides and the monoalkyl aluminum dihalides.

These catalysts may also be formed in situ during the reaction itself. This production of the catalysts in situ may be effected, for example, by adding to the reaction mixture of the aluminum olefin and hydrogen an organic halogen compound as, for example, a halogenated hydrocarbon which will form the alkyl aluminum halide in the reaction mixture. For this purpose methyl or ethyl chlorides or bromides, or any alkyl iodides may preferably be used. In this connection, alkyl aluminum sesqui-halides are formed, which, however, are completely converted into dialkyl aluminum halides when the reaction between the aluminum, hydrogen and olefin precedes with the formation of aluminum trialkyls. These dialkyl aluminum monohalides appear to be the true catalysts, since this conversion of the sesqui-halides into the monohalides occurs whenever aluminum trialkyls are formed.

In this embodiment it has been found preferable to add finished aluminum trialkyl from the very start, so that the alkyl aluminum halides formed by the reaction between the halogenated hydrocarbons and the aluminum are immediately converted to the dialkyl aluminum monohalide form.

The dialkyl aluminum monohalides may also be prepared prior to the reaction of the aluminum hydrogen and olefin by reacting aluminum halide or a monoalkyl aluminum dihalide with an aluminum trialkyl, such as an aluminum trialkyl which has already been prepared in the reaction.

In accordance with the preferred mode of operation, the dialkyl aluminum monohalides are separately prepared by reacting aluminum and the halogenated hydrocarbon and only effecting the reaction of the aluminum with the olefins and hydrogen in the presence of these pre-formed dialkyl aluminum monohalides.

In accordance with this embodiment it is preferable to convert a portion of the aluminum with a halogenated hydrocarbon into the sesqui-halide. In this connection it is possible to effect the conversion into the sesqui-halides in the intial presence of alkyl aluminum halides, and particularly alkyl aluminum sesqui-halides. If the liquid sesqui-halide is then removed to an extent that a portion that just sufficiently wets the aluminum still remains, there is obtained a mixture of a large amount of aluminum and a small amount of sesqui-halide, which is excellently suited for carrying out the reaction with the hydrogen and olefin. A sufficient amount of finished aluminum trialkyl should first of all be added to this mixture of aluminum and a small amount of sesqui-halide sufficient to wet the same, so that the sesqui-halide will be completely converted into the dialkyl monohalide. The olefin is then added and the hydrogen forced in under pressure and the mixture heated to form the aluminum alkyl. If after the consumption of the hydrogen and the olefin added, the aluminum trialkyl, which is formed, is removed from the autoclave along with the major portion of the halogen-containing aluminum compound, the remaining aluminum may be directly again reacted with new olefin and newly added hydrogen to form further amounts of aluminum alkyl compounds. This indicates that it is possible that the dialkyl aluminum monohalides do not act directly as catalysts, but rather that the aluminum surface is activated by the reaction of the aluminum with the halogenated hydrocarbon and remains in this activated condition even after the removal of the organic aluminum halogen compound. Accordingly, the reaction sequence may be repeated several times, provided a sufficient quantity of aluminum is initially present.

While the activation of the aluminum may be effected with very small quantities of catalyst, the reaction will proceed more rapidly, the larger the quantity of catalyst present in the reaction mixture. It has been found preferable to use reaction mixtures which contain amounts of the alkyl aluminum halides of 5 to 10% in the case of chlorides, 10 to 20% in the case of bromides, and about 20 to 30% in the case of iodides. With the use of these high catalyst concentrations, the reactions start easily and smoothly and take place rapidly. It is also possible to introduce additional quantities of olefin and hydrogen into the reaction chamber without the further addition of fresh catalyst with the reaction continuing without a substantial decrease in its velocity. After repeating this procedure several times, however, the catalyst concentration in the reaction mixture will finally become so low that the reaction velocity will be noticeably reduced, and when this point is reached, it is advisable to again work up the reaction mixture.

For the carrying out of the reaction proper between the activated aluminum, the olefins, and hydrogen, it is advisable to use the aluminum in a form in which it has a large surface, as, for example, divided form. In this connection, it is not necessary to select a particularly finely powdered aluminum. Aluminum shot, such as used frequently for the thermite process, is very suitable, as is aluminum shavings, including this form of aluminum scrap. It is furthermore advisable to see to its that the aluminum is present in the reaction vessels at all times in substantially larger quantity than the quantities of olefins and hydrogen introduced at the same time can dissolve, i.e., the entire process is advisedly carried out in such a manner that aluminum in excess is introduced into the reaction vessel, such as an autoclave, the olefin and the catalyst then added, hydrogen is forced in, and the autoclave heated with good mechanical mixing until the beginning of the reaction can be noted by the decrease in pressure. When the hydrogen has been extensively used up and the reaction thus has come to a standstill, the liquid Al-organic compound which has been produced can be removed, along with any dissolved catalyst, the aluminum consumed can be replaced by new aluminum and the same container can then be immediately used for the next batch.

The process is preferably effected with hydrogen under a pressure which may be as high as desired, but in principle need not exceed 100 atmospheres. Advisedly, the hydrogen pressure is allowed to fluctuate during the process between about 300 atmospheres and 100 atmospheres, in which case the reaction takes place particularly rapidly. However, a pressure range of 10 to 100 atmospheres can also be used just as satisfactorily, except that the entire conversion takes a correspondingly longer period of time.

The reaction between the olefins, the hydrogen, and the aluminum proceeds with substantial speed from about 70° C., and is rapid at 100 to 110° C. In the case of particularly active aluminum, the reaction can start at even lower temperatures down to room temperature. The temperature can also be increased substantially up to about 200° C. The higher temperatures may be necessary when proceeding with the addition of halogenated hydrocarbons instead of working with completely preformed catalysts. Such high temperatures, however, are not advisable, since they lead in an increased extent to certain side reactions.

These side reactions first of all comprise a simple catalytic hydrogenation of the olefins. Halogen-containing aluminum compounds have a clear action as hydrogenation catalysts (it is known that olefins can be hydrogenated rather well in the presence of aluminum chloride), and this hydrogenation enters more in evidence the higher the temperature. By this hydrogenation a part of the substances used are uselessly lost. Temperatures between about 90 and 120° C. have been found to be optimum with the extent of this hydrogenation being very slight. As a rule, it will have to be expected that an amount of about 5 to 20% of the olefin bound in the form of aluminum trialkyl will form saturated hydrocarbons as by-products at the end of the reaction.

A further complication of the process in accordance with the invention is based on the fact that at the indicated temperatures, reactions are already possible between the olefins and the aluminum trialkyls formed, namely, reactions of the type described in German Patent No. 878,560. This disturbance is particularly strongly pronounced when using ethylene, since ethylene of all olefins has the highest reactivity with respect to aluminum trialkyls. Accordingly, it is not easy in the case of ethylene to produce aluminum triethyl directly in a good yield in accordance with the process, since higher aluminum alkyls are regularly formed by further addition of ethylene to triethyl aluminum formed. If, however, it is not important specifically to produce triethyl aluminum, but if it is a sufficient, for example, for an intended use of the aluminum alkyls as catalysts, to prepare merely compounds having complete organic bonding of the aluminum to three carbon atoms, it is possible to use ethylene. Furthermore, the formation of triethyl aluminum itself increases with lower temperatures.

These disturbances are very much less if higher homologues of ethylene are used in the process of the invention. In this connection, α-olefins, such as propylene and the hydrocarbons, which can be derived from it by substitution on the methyl radical, are better suited for the process of the invention than olefins having the double bond within the chain. Propylene and α-olefins can also be modified, and, in particular, dimerized in accordance with the process of German Patent 878,560 by heating together with aluminum trialkyls as catalysts, but these reactions still take place very slowly at the optimal temperature of about 90 to 120° C., so that the preparation, for example, of tripropyl aluminum from aluminum propylene and hydrogen or of tri-octyl aluminum from aluminum α-octylene and hydrogen is directly possible in accordance with the process of the invention.

The best results, however, are obtained if there are used as olefins asymmetrically di-substituted ethylenes, i.e., hydrocarbons of the following structure.

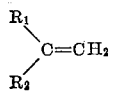

in which R and R₂ are the same or different hydrocarbon radicals. The simplest hydrocarbon of this nature is isobutylene. Other such olefins can be prepared by dimerization of α-olefins in accordance with the method of German Patent No. 878,560. For example, dimeric propylene or 2-methyl-pentene-(1) is excellently suited for the carrying out of the process of the invention. The reason for the particular suitability of these hydrocarbons is that olefins of this kind are not modified in any way, even upon long heating together with aluminum alkyls at elevated temperature. These hydrocarbons are also entirely stable to the dialkyl-monohalides acting as catalysts. From the above it is apparent that the olefins suitable for use in accordance with the invention are olefins having the general formula

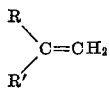

in which R and R' are both hydrogen or both hydrocarbon radicals or one hydrogen and the other a hydrocarbon radical. These olefins are generically referred to in the claims as "mono-olefins of the vinyl type."

When using the starting aluminum which has been activated mechanically, and when the desired aluminum trialkyl is not initially at hand, the reaction may be effected in the presence of a compound which is even more sensitive to air than aluminum, and is compatible upon reaction with olefins and hydrogen with the desired reaction products. Examples of such materials include zinc alkyls, magnesium alkyl halides (Grignard compounds), or alkyl aluminum halides. With the use of these materials, however, difficulties are encountered in the subsequent isolation of the reaction products in pure form, and thus to the extent that the desired aluminum trialkyl is produced during the process, the other halogen-containing by-products are replaced.

The reaction between the activated aluminum, the olefins, and the hydrogen may be effected in any conventional pressure vessel, as, for example, rotating pressure vessels or autoclaves provided with agitators. In order to effect the process on a larger scale, there may be used a vertical pressure-resistant reaction tower, into which the liquid pulp of activated aluminum, such as the mechanically activated aluminum in aluminum trialkyl or an inert solvent, or mixtures thereof may be introduced from the top. If the inert solvent is not the olefin which is to be reacted itself, the olefin is also introduced into the tower from the top. The hydrogen is introduced under pressure from the bottom and is recycled, thus assuring a constant eddying of the aluminum, and mixing of the contents in the tower.

In a case where the aluminum is activated by the presence of the catalyst, the aluminum, as for example, aluminum shot, the olefin, and catalyst may be introduced into the reaction tower from the top. By means of injection pumps, a solution of the catalyst in the olefin may be continuously added and the reaction product is charged at a given rate at the upper end of the reaction tower. This quantity which is removed may then be fed to a catalyst-recovery unit. The catalyst is then pumped back to the reaction chamber. Furthermore, a charging device for the aluminum shot may also be provided. In this way, large quantities of aluminum trialkyls may be continuously prepared in a simple manner.

When using catalysts to activate the aluminum, the direct products of the process in accordance with the invention are at first mixtures of aluminum trialkyls, dialkyl aluminum monohalides as were used as catalysts, and traces of the olefinic hydrocarbons used, partly in hydrogenated form. This hydrocarbon portion in the reaction mixture is relatively large, if, as is, of course, readily possible, technical olefin-paraffin mixtures are used for the process rather than pure olefins. The alkyl radicals in the aluminum trialkyls of these reaction products are furthermore not necessarily homogeneous, as will furthermore be noted from the description, with the use of ethylene. Additionally, homogeneous reaction products will not be produced if crude olefin mixtures, for example, cracked gasolines, are used for the process of the invention. It is, however, unimportant with regard to the course of the process itself whether the olefins used are homogeneous or not.

The aluminum-organic portion of the reaction products need, furthermore, not necessarily consist entirely of true aluminum trialkyls. Intermediate aluminum hydrides are frequently admixed with the aluminum trialkyls produced in accordance with the method of the invention, particularly in the form of dialkyl aluminum hydrides $R_1R_2AlH$.

It is clear that such compounds can be converted into true aluminum trialkyls by the addition of a third olefin molecule. Conversely, it has been found that such dialkyl aluminum hydrides can also form in the course of the working up of the products obtained in accordance with the process of the invention by the splitting off of olefins from true aluminum trialkyls.

It is unimportant by which of the said two methods these dialkyl aluminum hydrides are produced. In any event, certain quantities of such dialkyl aluminum hydrides are frequently present in the reaction products obtained in accordance with the invention. They may even, under certain conditions, become the main products. For the present invention, aluminum trialkyls and dialkyl aluminum hydrides are completely equivalent materials, since an after-treatment of the dialkyl hydrides with olefins converts them completely into true aluminum trialkyls, and it is obviously unimportant whether this complete saturation with olefin takes place already during the main reaction of the inventive process, or only in the course of a subsequent additional operation.

In all cases, the products of the process still contain dialkyl aluminum halides where the same were used, as catalyst to activate the aluminum and the aforementioned hydrocarbons. The hydrocarbons can be eliminated very easily by simple distillation or vacuum distillation. For the preparation of pure aluminum trialkyls (or their mixtures with dialkyl aluminum hydrides) it is naturally necessary to again separate the catalyst portions. It is frequently advisable to recover these catalyst portions in a form which permits their direct further use in the process. This, however, is not a necessary condition for the carrying out of the method in accordance with the invention, since these catalysts are in part so cheap that it is sufficient merely to eliminate them.

The measures for eliminating or recovering the halogen-containing catalysts depend on the quantity of catalysts used and also on the value of the halogen contained in them, as well as on the intended use of the products. For many uses of the aluminum trialkyls the presence of a certain quantity of halogen-containing catalysts is not objectionable.

Depending on the nature of the particular reactions selected, the reaction mixtures may contain a few percentages of halogen up to a maximum, in the case of iodine (and in the case of a single reaction), of about 30%.

If a chlorine-containing catalyst has been used, the reaction product finally contains only a low percentage of chlorine, and it is then simplest to remove the halogen by heating the reaction mixture with some metallic sodium while agitating. The aluminum trialkyl formed can then either, if necessary, be distilled in a vacuum or high vacuum, or else be used directly without distillation.

If an iodine-containing catalyst has been used, the aluminum trialkyl produced can be separated in a very simple manner from the dialkyl aluminum iodide present by distillation, preferably in a vacuum, since there is sufficient difference between the boiling points of the aluminum trialkyls and the dialkyl aluminum iodides for this separation. The iodine-containing catalysts is then simply recovered as distillation residue and can be added to a new experimental batch. It is clear that it will be advisable to use as catalyst in these cases dialkyl aluminum iodides which have the same radicals as the aluminum trialkyls which it is desired to prepare.

This easy recovery of the catalyst is of particular advantage when working with iodine compounds, and can outweigh the disadvantage of higher price.

In the case of chlorine-and bromine-containing catalysts, a similar simple separation by distillation is in general not possible, since the difference between the boiling points is too small. Only in the case of tri-isobutyl aluminum can the separation of the chlorine- and bromine-containing catalysts be effected in a very simple manner by a distillation in a high vacuum. In this special case, the difference between the boiling points of the tri-isobutyl aluminum on the one hand and the mono-chloro-diisobutyl aluminum or mono-bromo-di-isobutyl aluminum on the other hand is so great that it permits separation by distillation. In this connection, however, it must be noted that the tri-isobutyl aluminum begins to split off one mol isobutylene at temperatures above 100° C. and passes into di-isobutyl aluminum hydride, which boils, at a substantially higher temperature than the tri-isobutyl aluminum. The separation of the aluminum di-isobutyl hydride from the di-isobutyl aluminum chloride or bromide by distillation is therefore possible only with difficulty. The separation of the tri-isobutyl aluminum from the mono-chloro-di-isobutyl aluminum or mon-bromo-di-isobutyl aluminum is therefore advisedly effected under so low a pressure that the temperature of 100° C. is not exceeded either in the boiling liquid phase or in the distillate.

In the case of the other aluminum trialkyls besides triisobutyl aluminum, the recovery of the chlorine- and bromine-containing catalysts can be effected by stirring the reaction products of the process of the invention in the hot, in a quantity of potassium chloride or potassium bromide equivalent to the total halogen content. These two halogen compounds of potassium give, with dialkyl-aluminum chlorides or bromides, complex compounds of the formula

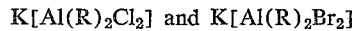

which in many cases separate as a difficulty soluble oily layer under the reaction products but at times also remain in solution depending on the nature of the aluminum trialkyl present or the quantity of catalyst substance. These molecular compounds can either be separated directly or else the aluminum trialkyls can be distilled away from the complex compounds at the lowest possible temperature, and preferably under a high vacuum. At elevated temperature, these complex compounds can then be split again upon the heating in vacuum into the solid alkali metal salts and dialkyl aluminum chlorides or bromides remaining as residue.

In the case of the preparation of tri-isobutyl aluminum:

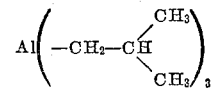

a particularly simple separation of the halogen-containing catalysts portions from the reaction product is possible by subjecting the reaction product to a low-temperature cooling. In this connection, the tri-isobutyl aluminum, which melts at about 0° C., crystallizes out in pure condition and can be separated directly in a suitable manner from the catalyst portion, which remains liquid. The latter is then returned to the process.

The following examples are given by way of illustration and not limitation:

*Example 1*

Two hundred and fifty grams of aluminum shot are ground wet for 10 hours with 2500 cc. tri-isobutyl aluminum in a ball mill which is filled with nitrogen, whereupon the rather thin suspension is introduced into an eight liter autoclave. The suspension is first of all allowed to settle and then 1500 cc. clear tri-isobutyl aluminum is removed. 1.8 kg. isobutene is introduced, and thereafter hydrogen is forced in until the pressure is 200 atmospheres. The autoclave is then heated to about 110–120° C. while shaking or stirring it. The pressure decreases to 60 atmospheres in 4 to 5 hours. The autoclave is then set aside to cool and the pressure from the hydrogen and some isobutane produced as by-product is removed. The liquid contents of the autoclave are then allowed to flow out and 2,500 cc. of practically pure tri-isobutyl aluminum are obtained. There has thus been newly formed a quantity of 1,500 cc. of tri-isobutyl aluminum.

The liquid product removed from the autoclave at first still has a somewhat dark appearance, since it contains suspended in it the impurities of the aluminum used, as well as some unreacted aluminum. However, it can be readily freed from these admixtures by centrifuging, vacuum-distillation, or filtration.

If this experiment is operated with a temperature higher than the one indicated, the overall reaction takes place more rapidly. The reaction product in this case, however, contains considerable amounts of di-isobutyl aluminum hydride, which can be converted by after-treatment with isobutylene at about 100° C. into tri-isobutyl aluminum.

Example 2

Two hundred and fifty grams of a solid aluminum block are introduced into a cutting device in which there are introduced 250 cc. tri-isobutyl aluminum and 2,250 grams isobutene. After the cutting, the suspension is placed in an autoclave provided with an agitator and hydrogen is forced in up to a pressure of 250 atmospheres. The autoclave is heated for 6 hours at 130° C. with agitation. The pressure gradually decreases. There is obtained practically pure tri-isobutyl aluminum in a quantity of 2,300 grams.

Example 3

Into a two-liter autoclave, which has first been scavenged with nitrogen, there are added 800 grams aluminum shot and 200 grams dipropyl aluminum iodide, whereupon 600 grams of liquid propylene are forced in. Thereafter hydrogen is forced in under a pressure up to 300 atmospheres' gauge. The autoclave is carefully warmed up and vigorously shaken or rolled in this connection. The pressure, first of all, increases somewhat. However, from about 90° C. a certain pressure drop can be noticed. At about 100° C. the pressure drop becomes rapid. After about 12 hours, the pressure has dropped to about 50 atmospheres' gauge. The autoclave is allowed to cool, and all gaseous components are blown out. Thereupon the liquid present in the autoclave is allowed to discharge under nitrogen, but the aluminum which has not been consumed is retained as completely as possible in the autoclave. There are obtained 600 to 650 grams liquid reaction product which is first of all freed in vacuum from the traces of readily volatile constituents and then distilled in a column. There are obtained at first 400 grams tripropyl aluminum of a boiling point of 110° C. at 13 mm. This product still contains only traces of iodine. The remaining iodine-containing catalyst can thereupon be further distilled in a high vacuum and has a boiling point of 110 to 140° C./0.02 mm. The catalyst can be used directly for a repetition of the experiment.

Example 4

In an autoclave of 13 liters' capacity, equipped for rolling, there are introduced 3 kg. aluminum shot and 6 liters 2-methyl-pentene-(1), whereupon 750 grams of aluminum diethyl chloride are added. After the forcing in of hydrogen at a pressure of 300 atmospheres' gauge, the autoclave is heated to about 110 to 120° C., whereupon the hydrogen pressure drops within 10 hours to 80 atmospheres' gauge. The autoclave is allowed to cool, the excess hydrogen blown off, and the water-clear liquid reaction product allowed to discharge. If this liquid is heated, there first of all distill off 1,200 grams of a mixture of iso-pentene-(1) and some iso-pentane. A titration of this mixture with bromine shows that about 65% unreacted olefin is still present. The remaining crude mixture of tri-isohexyl aluminum and chlorine-containing catalyst is divided into two equal parts which are again reacted in two consecutive operations in the same reaction vessel, each with 5 liters of 2-methyl-pentene-(1) and hydrogen impressed in a pressure of 300 atmospheres' gauge. In this way there are finally obtained 8.5 kg. tri-isohexyl aluminum having a chlorine content of 2.6%. The entire quantity is introduced into an agitator vessel which is filled with nitrogen, 160 grams of sodium are added, and the vessel is heated while stirring at 120° C. until a small specimen of the content withdrawn under nitrogen is free of halogen. Thereupon, the tri-iso-hexyl aluminum can be distilled in a very high vacuum, advisedly with the use of a device for so-called short-path distillation. It passes over completely at a bath temperature of 120° C. and then contains a substantial amount of di-isohexyl aluminum hydride, which can be noted from the fact that the product, upon decomposition with water, gives off a certain quantity of hydrogen.

Example 5

Example 4 is repeated, using ½ gram aluminum di-isobutyl bromide as the catalyst and adding 4 kg. isobutylene into the autoclaves. The course of the reaction is then similar to that described in the preceding example. The reaction product, freed in a mild vacuum at room temperature from traces of $C_4$-hydrocarbons, is thinly liquid and transparent. It is stirred with 300 grams potassium bromide at 100 to 120° C. in an agitator vessel filled with nitrogen, whereupon the aluminum tri-isobutyl is distilled out via a short column at a bath temperature of about 100° C. in a vacuum of as far as possible 0.1 mm. It was a boiling point of 33 to 35° C. under 0.1 to 0.5 mm. mercury pressure. The aluminum tri-isobutyl solidifies upon cooling with ice in the form of long, colorless needles. The distillation also supplies tails, which are also liquid and consist of di-isobutyl aluminum hydride. A total of 3,200 grams of practically halogen-free tri-iso-butyl aluminum compounds are recovered. The vessel used for the distillation is further heated in vacuum over a condenser to 200° C. bath temperature. Thereupon, di-isobutyl aluminum bromide distills over into the receiver.

Example 6

Example 3 is repeated, using, instead of the dipropyl aluminum iodide, a mixture of 140 grams ethyl bromide and 52 grams triethyl aluminum, and, furthermore, instead of the propylene, 1 liter 2-methyl-pentene-(1). Hydrogen is then forced in up to a pressure of 100 atmospheres' gauge and the autoclave heated to 150 to 160° C. Each time that the pressure drops to about 60 atmospheres, hydrogen is again forced in to a pressure of 100 atmospheres' gauge. In this way, over the course of 20 hours, a total hydrogen of 200 atmospheres' gauge is absorbed, whereupon the autoclave is cooled, the remaining hydrogen is blown off, and the clear liquid is allowed to discharge under nitrogen. Upon heating, 400 cc. of a mixture of 25% 2-methyl-pentene (1) and 75% 2-methyl-pentane distill off. There are obtained 550 grams residue, which can be used directly as catalyst for the dimerization of propylene in accordance with Example 5 of German Patent No. 878,560.

Example 7

Example 5 is repeated, but the aluminum di-isobutyl bromide is replaced by 250 grams of aluminum di-isobutyl chloride. By a suitable adjustment of the hydrogen addition, the reaction is so conducted that certain quantities of isobutene are still contained in the autoclave at the end of the reaction. As a result of this measure, no di-isobutyl aluminum hydride or only a very slight amount thereof is contained in the reaction product. The reaction product, freed in a moderate vacuum at room temperature from traces of the $C_4$-hydrocarbons is distilled in vacuum and then subjected, with the exclusion of air, to a low-temperature cooling of −20 to −30° C. The main portion of the tri-isobutyl aluminum crystallizes out in this connection. It is separated by filtration under nitrogen or by centrifuging in a centrifuge filled with nitrogen from the liquid components, thereupon again melted and stored under nitrogen. The portion which has remained liquid in connection with the separation contains the catalytically active halogen compound. It is returned into the reaction vessel and immediately used for a new reaction. The yield corresponds approximately to that indicated in Example 5.

*Example 8*

The procedure of Example 4 is repeated until 8.5 kg. tri-isohexyl aluminum, having an average chlorine content of 2.6%, are obtained. There still remains in the autoclave a considerable portion of the 3 kg. of aluminum shot originally used, wetted with chlorine-containing tri-isohexyl aluminum. 5 liters 2-methyl-pentene-(1) are again added into the autoclave, 200 atmospheres hydrogen forced in, and heating is effected with repeated supplementing of the consumed hydrogen at 150 to 160° C., until the hydrogen absorption has terminated or still proceeds only very slowly. The autoclave is then allowed to cool, and the liquid reaction product, which is removed under nitrogen, consists of practically pure aluminum di-isohexyl hydride with which there is admixed only some isohexane from which it can easily be freed by heating in a mild vacuum.

When reference is made herein and in the claims to an "inert liquid" with respect to the mechanical activation of the aluminum, the same is merely intended to designate that the liquid will not react with the aluminum to form the passive oxide coating and will not enter into any undesirable side reactions with the aluminum. The liquid may, of course, be "reactive" with the aluminum to form the desired aluminum trialkyls and/or aluminum alkyl hydrides.

We claim:

1. Process for the preparation of aluminum alkyls selected from the group consisting of aluminum trialkyls and alkyl aluminum hydrides, which comprises reacting aluminum having at least a portion of its surface in metallic form substantially free from oxide coating with at least one mono-olefin of the vinyl type and hydrogen at elevated pressures, and recovering the group member formed.

2. Process according to claim 1, in which said reacting is effected at a pressure between about 10 and 300 atmospheres gauge at a temperature between about 70 and 200° C, and in which said contacting is effected with an excess of aluminum.

3. Process according to claim 2, in which said reacting is effected with an excess of aluminum.

4. Process according to claim 1, in which said olefin is present in admixture with other hydrocarbons.

5. Process according to claim 1, which includes reacting the recovered group member formed with an olefin at a temperature of about 100° C. to thereby convert any dialkyl aluminum hydride present into aluminum trialkyl.

6. Process for the preparation of aluminum alkyls selected from the group consisting of aluminum trialkyls and alkyl aluminum hydrides, which comprises mechanically exposing an aluminum surface by mechanical comminution in a substantially inert surrounding, and thereafter reacting said surface with at least one mono-olefin of the vinyl type and hydrogen at elevated pressures and recovering the group member formed.

7. Process according to claim 6, in which said mechanical comminution is effected with the complete exclusion of air and moisture in a dry inert gas.

8. Process according to claim 6, in which said mechanical comminution is effected under an inert liquid.

9. Process according to claim 8, in which said inert liquid is a member selected from the group consisting of aluminum trialkyls and aluminum alkyls hydrides similar to the aluminum alkyls to be formed, olefins similar to the olefins to be contacted, and mixtures thereof.

10. Process according to claim 9, in which said inert liquid and said solid aluminum are present in a ratio of amounts of about 10:1.

11. Process for the preparation of aluminum alkyls selected from the group consisting of aluminum trialkyls and alkyl aluminum hydrides, which comprises atomizing molten aluminum in an inert gas stream and thereafter reacting the dust formed with at least one mono-olefin of the vinyl type and hydrogen at elevated pressure, and recovering the group member formed.

12. Process for the preparation of aluminum alkyls selected from the group consisting of aluminum trialkyls and alkyl aluminum hydrides, which comprises vaporizing aluminum under a high vacuum, rapidly cooling the vapor in an inert atmosphere, and thereafter reacting the aluminum dust obtained with at least one mono-olefin of the vinyl type and hydrogen at elevated pressure, and recovering the group member formed.

13. Process for the preparation of aluminum alkyls selected from the group consisting of aluminum trialkyls and alkyl aluminum hydrides, which comprises reacting subdivided aluminum, surface-activated with an alkyl aluminum halide, with at least one mono-olefin of the vinyl type and hydrogen at elevated pressures to form at least one member of said group and recovering the group member formed.

14. Process according to claim 13, in which said alkyl aluminum halide is a dialkyl aluminum monochloride present in amount of about 5 to 10%, based on the reaction mixture.

15. Process according to claim 13, in which said alkyl aluminum halide is a dialkyl aluminum monobromide present in amount of about 10 to 20%, based on the reaction mixture.

16. Process according to claim 13, in which said alkyl aluminum halide is a dialkyl aluminum monoiodide present in amount of about 20 to 30%, based on the reaction mixture.

17. Process according to claim 13, in which said olefin is isobutylene and in which said recovery includes distilling off the tri-isobutyl aluminum formed by distillation under vacuum at a temperature not substantially in excess of 100° C.

18. Process according to claim 13, in which said recovery includes stirring the reaction mixture with a quantity of a potassium halide, substantially equivalent to the total halogen content in the reaction mixture, and separating the aluminum alkyls from the halogen-containing complex compounds formed.

19. Process according to claim 13, in which said olefin is iso-butylene, and in which said recovery is effected by cooling to thereby crystallize out the tri-isobutyl aluminum formed.

20. Process for the preparation of aluminum alkyls selected from the group consisting of aluminum trialkyls and alkyl aluminum hydrides, which comprises reacting subdivided aluminum with at least one mono-olefin of the vinyl type and hydrogen at elevated pressure, said aluminum having at least a portion of its surface in metallic form substantially free from oxide coating and contacted prior to the initiation of said reaction with a member selected from the group consisting of aluminum trialkyls, aluminum alkyl hydrides, and alkyl aluminum halides, and recovering the first-mentioned group member formed.

21. Process according to claim 20, in which said aluminum is subdivided by comminution in the presence of a member of said group consisting of aluminum trialkyls, aluminum alkyl hydrides, and alkyl aluminum halides.

22. Process according to claim 20, in which said reacting with said olefin and hydrogen is effected with an excess of aluminum.

23. Process according to claim 22, in which said olefin is an asymmetrically di-substituted ethylene.

24. Process according to claim 13, in which said reacting is effected at a pressure between about 10 and 300 atmospheres' gauge and a temperature between about 70 and 200° C.

25. Process for the preparation of aluminum alkyls selected from the group consisting of aluminum trialkyls and alkyl aluminum hydrides, which comprises reacting sub-divided aluminum, in the presence of such group member, with a halogenated hydrocarbon to thereby produce in situ alkyl aluminum halide and further reacting the resulting reaction mixture with at least one mono-olefin of the vinyl type and hydrogen at elevated pressures to form at least one member of said group, and recovering the group member formed.

26. Process according to claim 13, in which said alkyl aluminum halide is formed by mixing a major portion of aluminum with a minor portion of an alkyl aluminum sesqui-halide, thereafter reacting the mixture with an amount of an aluminum trialkyl sufficient to convert the sesqui-halide into dialkyl aluminum monohalide, in which the aluminum trialkyl formed after said olefin reacting is recovered with the major portion of the halogen-containing aluminum compound, in which the product so recovered is reacted with an olefin and hydrogen at least one additional time, and in which the first-mentioned group member formed is recovered from said last olefin-reacted reaction mixture.

27. Process according to claim 20, in which the recovered group member is reacted with an olefin at a temperature of about 100° C. to thereby convert any dialkyl aluminum hydride present into aluminum trialkyl.

28. A process according to claim 20 in which said aluminum is contacted with said member of the group consisting of aluminum trialkyls, aluminum alkyl hydrides, and alkyl aluminum halides prior to and during the initiation of said reaction.

29. In the preparation of aluminum alkyls by reaction of finely divided aluminum with a mono-olefin containing the group $CH_2=C<$, and hydrogen, the step of contacting at an elevated temperature and superatmospheric pressure hydrogen with a mixture of aluminum in finely divided form and said olefin, in which mixture aluminum is present in excess over that reacted.

30. The process which comprises contacting at an elevated temperature and superatmospheric pressure aluminum in powder form with a mono-olefin containing the group $CH_2=C<$, and hydrogen gas, and recovering an aluminum alkyl selected from the class consisting of aluminum trialkyl and dialkyl aluminum hydride, the aluminum being in excess of one-third mol per mol of olefin reacted.

31. The process which comprises contacting at an elevated temperature and superatmospheric pressure aluminum in powder form with a mono-olefin containing the group $CH_2=C<$, and hydrogen, and recovering an aluminum trialkyl, the aluminum being in excess of one-third mol per mol of olefin reacted, and then reacting said excess of aluminum with additional olefin and hydrogen.

32. The process which comprises contacting at an elevated temperature and superatmospheric pressure aluminum in powder form with isobutylene and hydrogen and recovering aluminum triisobutyl, the aluminum being in excess of one-third mol per mol of isobutylene reacted, and then reacting said excess of aluminum with additional isobutylene and hydrogen.

33. The process which comprises contacting at an elevated temperature and superatmospheric pressure aluminum in powder form with a mono-olefin containing the group $CH_2=C<$, and hydrogen, and recovering an aluminum trialkyl from the reaction mixture, the reaction mixture containing olefin in molar proportion equivalent to less than twice the number of mols of aluminum present.

34. The process which comprises contacting at an elevated temperature and superatmospheric pressure aluminum in powder form with isobutylene and hydrogen and recovering aluminum triisobutyl from the reaction mixture, said mixture containing isobutylene in a molar proportion equivalent to less than twice the number of mols of aluminum present.

35. The process which comprises contacting at an elevated temperature and superatmospheric pressure aluminum in powder form with a mono-olefin containing the group $CH_2=C<$, and hydrogen, and forming a dialkyl aluminum hydride, said mixture containing olefin in molar proportion equivalent to less than twice the number of mols of aluminum present.

36. The process which comprises contacting at an elevated temperature and superatmospheric pressure aluminum in powder form with an olefin containing the group $CH_2=C<$, and hydrogen and forming a mixture of trialkyl aluminum and dialkyl aluminum hydride, said aluminum contacted being in excess of that reacted to produce said mixture of trialkyl aluminum and dialkyl aluminum hydride.

References Cited in the file of this patent
UNITED STATES PATENTS

| | | |
|---|---|---|
| 2,271,956 | Ruthruff | Feb. 3, 1942 |
| 2,886,581 | Redman | May 12, 1959 |